US008185295B2

(12) United States Patent
Nakasaka

(10) Patent No.: US 8,185,295 B2
(45) Date of Patent: May 22, 2012

(54) MULTI-CYLINDER ENGINE

(75) Inventor: Yukihiro Nakasaka, Shizuoka-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 420 days.

(21) Appl. No.: 12/416,226

(22) Filed: Apr. 1, 2009

(65) Prior Publication Data

US 2009/0248278 A1 Oct. 1, 2009

(30) Foreign Application Priority Data

Apr. 1, 2008 (JP) .................................. 2008-94534
Mar. 24, 2009 (JP) .................................. 2009-71128

(51) Int. Cl.
*F02D 41/24* (2006.01)

(52) U.S. Cl. ..... 701/111; 123/435; 123/481; 123/198 F; 123/406.23

(58) Field of Classification Search .............. 123/198 F, 123/198 DB, 198 DC, 481, 299, 300, 305, 123/435, 436, 406.12, 406.19, 406.23, 406.24, 123/406.25, 406.46, 406.5; 701/103–105, 701/110–112
See application file for complete search history.

(56) References Cited

U.S. PATENT DOCUMENTS

| 5,655,508 | A  | * | 8/1997  | Nonaka .......................... 123/683 |
| 5,720,257 | A  |   | 2/1998  | Motose et al. |
| 6,178,934 | B1 |   | 1/2001  | Hirasawa et al. |
| 6,389,806 | B1 | * | 5/2002  | Glugla et al. .................... 60/284 |
| 6,560,959 | B2 | * | 5/2003  | Katsuta et al. ................... 60/284 |
| 6,736,120 | B2 | * | 5/2004  | Surnilla ......................... 123/674 |
| 6,820,597 | B1 | * | 11/2004 | Cullen et al. ................... 123/520 |
| 7,096,112 | B2 | * | 8/2006  | Tanaka et al. ................... 701/114 |
| 7,481,039 | B2 | * | 1/2009  | Surnilla et al. ................... 60/274 |
| 7,503,308 | B2 | * | 3/2009  | Kitagawa ....................... 123/325 |
| 7,668,642 | B2 | * | 2/2010  | Fuwa et al. ..................... 701/112 |

FOREIGN PATENT DOCUMENTS

| JP | 03-172554   |   | 7/1991 |
| JP | 4171271     | A | 6/1992 |
| JP | 7063148     |   | 3/1995 |
| JP | 07071354    | A | 3/1995 |
| JP | 7217461     |   | 8/1995 |
| JP | 81 14133    |   | 5/1996 |
| JP | 8114133     |   | 5/1996 |
| JP | 2000154740  |   | 6/2000 |
| JP | 2001041084  |   | 2/2001 |
| JP | 2002161775  |   | 6/2002 |

(Continued)

OTHER PUBLICATIONS

Office Action from corresponding Japanese Patent Application No. 03-172664 dated Sep. 20, 2011; 5 pgs.

*Primary Examiner* — Hai Huynh
(74) *Attorney, Agent, or Firm* — Gifford, Krass, Sprinkle, Anderson & Citkowski, P.C.

(57) ABSTRACT

A multi-cylinder engine is configured to be able to perform a selected cylinder operation in which combustion is stopped in some cylinders. The multi-cylinder engine includes an ignition-timing adjustment section. This ignition-timing adjustment section retards ignition timing of each operating cylinder when the number of operating cylinders is small or when the engine operates in a selected cylinder operation mode in which explosion occurs at irregular intervals. In such a case, the peak of cylinder internal pressure is lowered by ignition timing retard. Thus, vibration and noise can be suppressed effectively.

15 Claims, 4 Drawing Sheets

FOREIGN PATENT DOCUMENTS

| | | |
|---|---|---|
| JP | 2006022667 | 1/2006 |
| JP | 2007015653 | 1/2007 |
| JP | 2007162607 | 6/2007 |
| JP | 2008057559 A | 3/2008 |
| JP | 2010-156349 * | 7/2010 |
| JP | 2010-236398 * | 10/2010 |

* cited by examiner

MULTI-CYLINDER ENGINE

CROSS REFERENCE TO RELATED APPLICATIONS

This Application claims priority of Japanese Patent Application No. 2008-94534, filed on Apr. 1, 2008 and Japanese Patent Application No. 2009-71128, filed Mar. 24, 2009, which are both incorporated herein by reference.

BACKGROUND OF THE INVENTION

1. Field of the Invention

The present invention relates to a multi-cylinder engine capable of performing a selected cylinder operation (operation in which combustion is stopped in some cylinders).

2. Description of the Related Art

Engines of such a type are disclosed in, for example, Japanese Patent Application Laid-open (kokai) Nos. H7-217461, H8-114133, 2000-154740, 2001-41084, 2006-22667, 2007-15653, and 2007-162607. In an engine of such a type, the stage of vibration generation changes between full-cylinder operation and selected cylinder operation. Therefore, measures must be taken against vibration and noise.

In view of the above, in the structure disclosed in Japanese Patent Application Laid-open No. H7-217461, the characteristics of a mount which supports an engine are changed between full-cylinder operation and selected cylinder operation. Further, in the structure disclosed in Japanese Patent Application Laid-open No. 2007-15653, the state of vibration generation is estimated from angular acceleration of a crankshaft of an engine, and operation of an actuator provided in an active-type damping support apparatus which supports the engine is controlled in accordance with the estimated state of vibration generation.

SUMMARY OF THE INVENTION

In an engine of such a type, in general, vibration and noise which give an unpleasant feeling to a driver and passengers of a vehicle tend to increase when the engine enters a selected cylinder operation and the number of operating cylinders decreases. In particular, in a certain mode of selected cylinder operation, the interval of ignition and explosion between operating cylinders becomes irregular (for example, during a virtual V-type, four-cylinder operation state of a V-type six-cylinder engine in which two cylinders are stopped). In such a selected cylinder operation in which explosion occurs at irregular intervals, vibration and noise may become greater.

The present invention has been accomplished to overcome the above-mentioned problems. That is, an object of the present invention is to more effectively suppress vibration and noise of a multi-cylinder engine which performs a selected cylinder operation.

<Configuration>

A multi-cylinder engine to which the present invention is applied is configured to be able to perform a selected cylinder operation in which combustion is stopped in some cylinders.

For example, the multi-cylinder engine includes a first-bank cylinder group and a second-bank cylinder group, and is configured such that its operation mode can be switched among a full-cylinder operation mode in which all the cylinders are operated; a two-cylinder operation mode in which one cylinder of the first-bank cylinder group and one cylinder of the second-bank cylinder group are operated; a three-cylinder operation mode in which three cylinders of the first-bank cylinder group or the second-bank cylinder group are operated; and a four-cylinder operation mode in which one cylinder of the first-bank cylinder group and one cylinder of the second-bank cylinder group are stopped.

The first-bank cylinder group includes a first-bank first cylinder, a first-bank second cylinder, and a first-bank third cylinder. These first-bank cylinders are arranged in a row along a cylinder arrangement direction to be in parallel with one another. The second-bank cylinder group includes a second-bank first cylinder, a second-bank second cylinder, and a second-bank third cylinder, which have center axes which form an angle greater than 0 degrees but not greater 180 degrees in relation to the center axes of the first-bank first to third cylinders. These second-bank cylinders are arranged in a row along the cylinder arrangement direction to be in parallel with one another.

In this case, the multi-cylinder engine may be configured such that, in the two-cylinder operation mode, two cylinders; i.e., the first-bank first cylinder and the second-bank third cylinder, which are located diagonally opposite each other, are operated, and, in the four-cylinder operation mode, the cylinders which are operated in the two-cylinder operation mode are stopped.

(1) One feature of the multi-cylinder engine of the present invention resides in provision of an ignition-timing adjustment section which retards ignition timing of each operating cylinder when ignition intervals of a plurality of operating cylinders become irregular during the selected cylinder operation (when explosion occurs at irregular intervals during the selected cylinder operation).

For example, the ignition-timing adjustment section may be configured to retard ignition timing of each operating cylinder in the four-cylinder operation mode from that in the full-cylinder operation mode. Alternatively, the ignition-timing adjustment section may be configured to retard ignition timing of each operating cylinder in the four-cylinder operation mode from that in the three-cylinder operation mode.

(2) Another feature of the multi-cylinder engine of the present invention resides in provision of an ignition-timing adjustment section configured such that, when the engine is in a second state in which the number of operating cylinders is smaller than that in a first state, the ignition-timing adjustment section retards ignition timing of each operating cylinder from that in the first state (for example, the smaller the number of operating cylinders, the greater the amount by which the ignition timing of each operating cylinder is retarded).

The multi-cylinder engine may further comprise a fuel injection adjustment section and/or an active mount. The fuel injection adjustment section is configured to increase an amount of fuel injected into each operating cylinder when the ignition-timing adjustment section retards the ignition timing of each operating cylinder. The active mount is configured to elastically support the body of the multi-cylinder engine and generate a vibration which cancels out a vibration generated during operation of the engine.

(3) In the configurations described in paragraphs (1) and (2) above, preferably, the ignition-timing adjustment section controls the ignition timing such that, when the number of operating cylinders is smaller than a state, the amount of ignition timing retard is greater than the state, under the condition that an amount of intake air per cylinder and an amount of fuel per cylinder are the same.

<Action and Effect>

In the multi-cylinder engine of the present invention having the above-described configuration, when the number of operating cylinders is small or when the selected cylinder operation is performed in a mode in which explosion occurs at irregular intervals (e.g., the above-mentioned four-cylinder operation mode), the ignition timing of each operating cylinder is retarded, whereby the peak of cylinder internal pressure is lowered. Thus, vibration and noise are effectively suppressed. Notably, the ignition timing can be retarded within a range in which a fuel consumption reduction effect is attained through the selected cylinder operation (within a range in which the fuel consumption reduction effect is not completely eliminated).

Further, since the fuel injection amount is increased with the ignition timing retard, a drop in output due to the ignition timing retard is compensated. Notably, the correction for increasing the fuel injection amount at the time of the ignition timing retard can also be performed within a range in which the fuel consumption reduction effect is attained through the selected cylinder operation.

Moreover, vibration and noise generated during the selected cylinder operation of the above-mentioned mode can be reduced to a range in which the active mount can satisfactorily suppress the vibration and noise. Accordingly, suppression of vibration and noise by means of the active mount can be performed more satisfactorily as compared with a conventional structure of such type.

Further, suppression of combustion vibration and reduction of fuel consumption can be achieved simultaneously by controlling the ignition timing in such a manner that, when the number of operating cylinders is smaller than a state, the amount of the ignition timing retard is greater than the state, under the condition that an amount of intake air per cylinder and an amount of fuel per cylinder are the same.

DETAILED DESCRIPTION OF THE PREFERRED EMBODIMENT

An embodiment of the present invention (the best mode contemplated by the applicant at the time of filing the present application) will next be described with reference to the drawings.

Notably, the following description of the embodiment merely describes a specific example of the present invention specifically to a possible extent so as to satisfy requirements regarding a specification (requirement regarding description and requirement regarding practicability) required under the law. Therefore, as described below, the present invention is not limited to the specific structure of the embodiment which will be described below. Various modifications of the present embodiment are described together at the end of the specification, because understanding of the consistent description of the embodiment is hindered if such modifications are inserted into the description of the embodiment.

<Structure of the Engine of the Embodiment>

Figure 1:
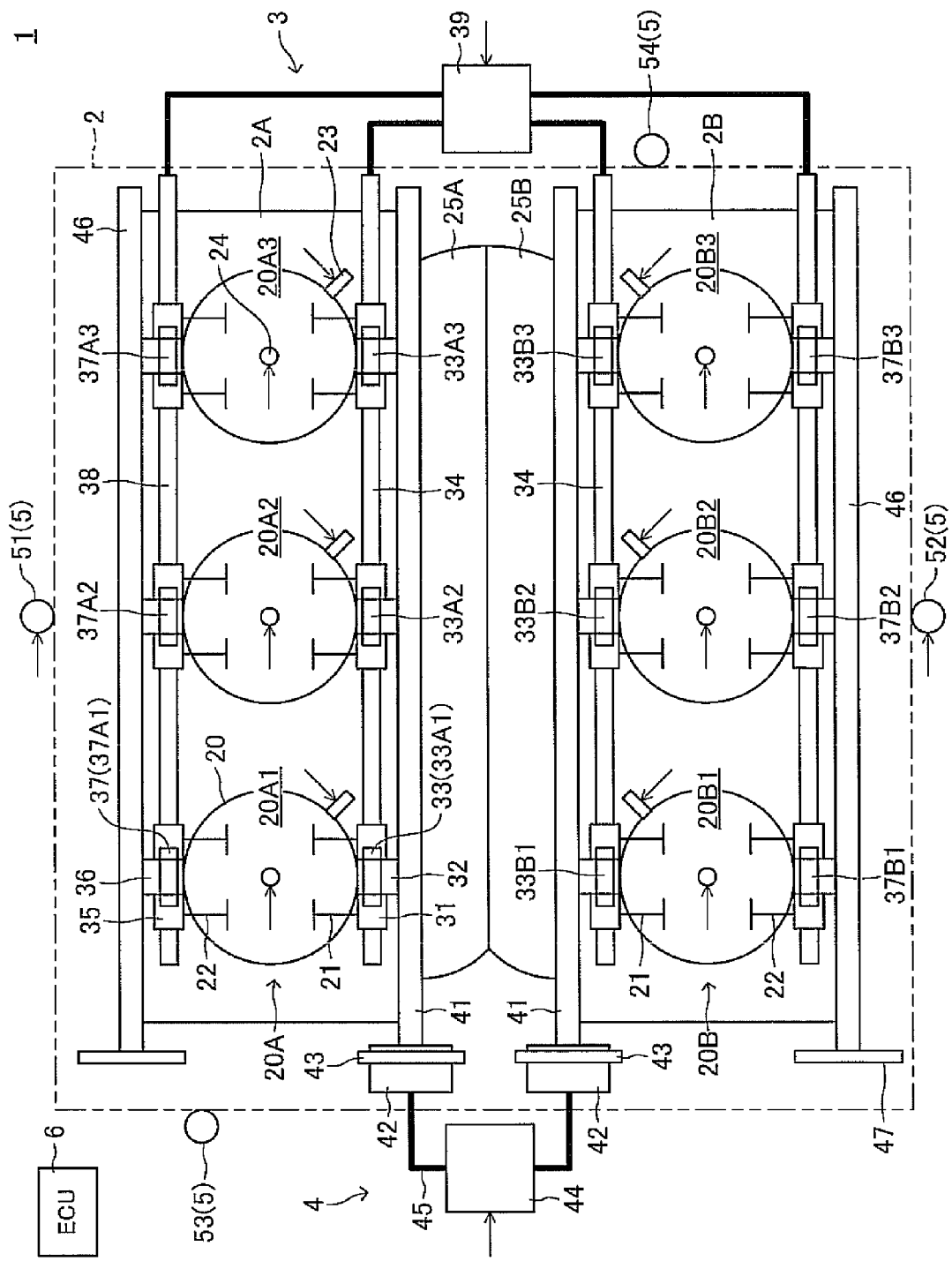
FIG. 1 is a schematic view showing the structure of a four-cycle, V-type six-cylinder reciprocating engine according to an embodiment of the present invention.

FIG. 1 is a schematic view showing the structure of a four-cycle, V-type six-cylinder reciprocating engine 1 (hereinafter simply referred to as the "engine 1"), which is one embodiment of a multi-cylinder engine of the present invention. This engine 1 is configured such that it can change the number of operating cylinders in accordance with operating conditions (the state of operation by a driver) and operating state (vehicle speed, engine speed, etc.).

Referring to FIG. 1, the engine 1 includes an engine block 2 (including a first bank 2A and a second bank 2B), a valve stoppage setting section 3, a valve drive section 4, an engine mount 5, and an engine electronic control unit 6 (hereinafter referred to as the "ECU 6").

<<Engine Block>>

In the engine block 2, which constitutes the body of the engine 1, the first bank 2A and the second bank 2B are provided such that they form a V-like shape as viewed from a side. Three cylinders 20 are provided in each of the banks 2A and 2B.

That is, a first-bank cylinder group 20A is provided in the first bank 2A. This first-bank cylinder group 20A includes a cylinder 20A1 (hereinafter simply referred to as the "A1 cylinder"), a cylinder 20A2 (hereinafter simply referred to as the "A2 cylinder"), and a cylinder 20A3 (hereinafter simply referred to as the "A3 cylinder"), which are disposed in parallel with one another. These A1 to A3 cylinders are arranged in a row along a cylinder arrangement direction (the left-right direction in FIG. 1).

Similarly, a second-bank cylinder group 20B is provided in the second bank 2B. This second-bank cylinder group 20B includes a cylinder 20B1 (hereinafter simply referred to as the "B1 cylinder"), a cylinder 20B2 (hereinafter simply referred to as the "B2 cylinder"), and a cylinder 20B3 (hereinafter simply referred to as the "B3 cylinder"), which are disposed in parallel with one another. These B1 to B3 cylinders are also arranged in a row along the above-mentioned cylinder arrangement direction.

Intake valves 21, exhaust valves 22, an injector 23, and a spark plug 24 are provided for each cylinder 20. The intake valves 21 are provided so as to open and close unillustrated intake ports. The intake ports of the A1 to A3 cylinders are connected with a common intake manifold 25A. Similarly, the intake ports of the B1 to B3 cylinders are connected with a common intake manifold 25B. Upstream end portions of the intake manifold 25A and the intake manifold 25B with respect to the flow direction of intake air are connected together.

The engine 1 of the present embodiment is operated in the following operation modes.

(1) Full-cylinder operation mode: fuel injection and ignition are performed in the sequence of the A1 cylinder-the B2 cylinder-the A3-cylinder-the B3 cylinder-the A2 cylinder-the B1-cylinder.

(2) Four-cylinder operation mode: of the cylinders in the ignition sequence, two cylinders; i.e., the A1 cylinder and the B3 cylinder, are stopped.

(3) Three-cylinder operation mode: the first-bank cylinder group 20A and the second-bank cylinder group 20B are alternately stopped every time the engine enters this mode.

(4) Two-cylinder operation mode: of the cylinders in the ignition sequence, the A1 cylinder and the B3 cylinder are operated, and the remaining cylinders are stopped.

<<Valve Stoppage Setting Section>>

The valve stoppage setting section 3 in the present embodiment is configured as follows so as to stop the operations of the intake valves 21 and the exhaust valves 22 of the stopped cylinders (maintain these intake and exhaust valves in the always-closed state) on the basis of the number of operating cylinders determined by the ECU 6.

An intake main rocker arm 31, an intake sub rocker arm 32, and an intake-side connection changeover section 33 are provided for each cylinder 20 so as to correspond in position to the intake valves 21 thereof. These components are attached to a corresponding intake rocker shaft 34.

The intake main rocker arm 31 is rockably supported by the intake rocker shaft 34, and is configured to open the corresponding intake ports by depressing the intake valves 21 and close the intake ports by releasing the intake valves 21 from the depressed state. The intake sub rocker arm 32 is rockably supported by the intake rocker shaft 34, and is configured to rock upon rotation of an unillustrated cam provided on an intake cam shaft 41 to be described later.

The intake-side connection changeover section 33 is configured to establish and break connection between the intake main rocker arm 31 and the intake sub rocker arm 32 in accordance with the supply state of oil pressure. The intake-side connection changeover section 33 (33A1, 33A2, 33A3, 33B1, 33B2, 33B3) is provided for each of the cylinders A1 to B3. An oil passage for supplying oil pressure to the intake-side connection changeover section 33 is formed within the intake rocker shaft 34.

Similarly, an exhaust main rocker arm 35, an exhaust sub rocker arm 36, and an exhaust-side connection changeover section 37 are provided for each cylinder 20 so as to correspond in position to the exhaust valves 22 thereof. These components are attached to a corresponding exhaust rocker shaft 38. The exhaust-side connection changeover section 37 (37A1, 37A2, 37A3, 37B1, 37B2, 37B3) is provided for each of the cylinders A1 to B3.

The oil passages provided in each intake rocker shaft 34 and each exhaust rocker shaft 38 are connected to an oil pressure control section 39. The oil pressure control section 39 is configured to control the supply of oil pressure to the intake-side connection changeover sections 33A1 to 33B3 and the exhaust-side connection changeover sections 37A1 to 37B3.

More concrete structures of various portions of the valve stoppage setting section 3 are well known (see, for example, Japanese Patent Application Laid-Open (kokai) Nos. H5-248216 and 2007-162606). Therefore, the more concrete structures will not be described herein.

<<Valve Drive Section>>

The valve drive section 4 is configured to drive (open and close) the intake valves 21 and the exhaust valves 22 of operating cylinders. Further, the valve drive section 4 is configured to advance and retard the open and close timings of the intake valves 21. Specifically, the valve drive section 4 includes valve timing controllers 42, intake timing gears 43, an oil pressure control section 44, oil passages 45, intake cam shafts 46, and exhaust timing gears 47, in addition to the above-mentioned intake cam shafts 41.

End portions of the intake cam shafts 41 are connected to the valve timing controllers 42. Each valve timing controller 42 includes a cylindrical housing having a center axis which coincides with the center axis of the corresponding intake cam shaft 41. Each valve timing controller 42 is configured to relatively rotate the corresponding intake cam shaft 41 in relation to the housing in accordance with the supply state of oil pressure, to thereby continuously change valve timings within a predetermined range. The intake timing gears 43 are fixed to the housings of the valve timing controllers 42.

The two valve timing controllers 42 are connected to the oil pressure control section 44 via the oil passages 45. The oil pressure control section 44 is configured to control the supply of oil pressure to the valve timing controllers 42 in accordance with the valve timings determined by the ECU 6, to thereby advance or retard the open and close timings of the intake valves 21. Since more concrete structures of the valve timing controllers 42 and the oil pressure control section 44 are well known, the more concrete structures will not be described herein.

The exhaust timing gears 47 are fixed to end portions of the exhaust cam shafts 46. The intake timing gears 43 and the exhaust timing gears 47 are connected to an unillustrated crankshaft via a connection mechanism such as a chain, so that the intake timing gears 43 and the exhaust timing gears 47 are rotated in synchronism with rotation of the crankshaft.

<<Engine Mount>>

The engine mount 5 is provided so as to support the engine block 2. The engine mount 5 includes a first mount 51, a second mount 52, a third mount 53, and a fourth mount 54.

The first mount 51 and the second mount 52 are arranged substantially perpendicular to the cylinder arrangement direction. Each of the first mount 51 and the second mount 52 is a so-called active mount including an elastic support section and an electric actuator. Each of the first mount 51 and the second mount 52 is configured to elastically support the engine block 2 and generate a vibration for cancelling out a vibration generated within the engine block 2 during operation (a vibration whose phase is opposite the phase of the vibration generated within the engine block 2 during operation). Meanwhile, the third mount 53 and the fourth mount 54 are arranged along the cylinder arrangement direction. Each of the third mount 53 and the fourth mount 54 is an ordinary engine mount, and is configured to elastically support the engine block 2.

<<<Operation Control Section>>>

The ECU 6, which constitutes the ignition-timing adjustment section and the fuel injection adjustment section of the present invention, is electrically connected to the injectors 23, the spark plugs 24, the oil pressure control section 39, the oil pressure control section 44, the first mount 51, the second mount 52, etc., and is configured to control operations of these components and sections.

Specifically, through control of relevant portions of the engine 1, in the full-cylinder operation mode, the ECU 6 performs fuel injection and ignition in the sequence of the A1 cylinder-the B2 cylinder-the A3-cylinder-the B3 cylinder-the A2 cylinder-the B1-cylinder. Further, in the above-described three-types of selected cylinder operation modest the ECU 6 stops fuel injection and ignition for corresponding stopped cylinders, and stops the operations of the intake valves 21 and the exhaust valves 22 of the stopped cylinders. Further, the ECU 6 continuously adjusts the open and close timings of the intake valves 21 by controlling the operation of the oil pressure control section 44.

Moreover, the ECU 6 in the present embodiment is configured to retard the ignition timings of operating cylinders and increase the fuel injection amount in the four-cylinder operation mode in which the ignition intervals of the plurality of operating cylinders become irregular (explosion occurs at irregular intervals).

<Outline of Operation in the Configuration of the Present Embodiment>

Next, the outline of operation of the engine 1 of the present embodiment will be described.

The ECU 6 determines the number of operating cylinders on the basis of the operating conditions and the operation state of the engine 1. At that time, the ECU 6 controls the oil pressure control section 39 in accordance with the number of operating cylinders, to thereby stop the operations of the intake valves 21 and the exhaust valves 22 of the stopped cylinders, and allow the operations of these valves of the operating cylinders (cancel the operation stoppage).

Further, the ECU 6 controls the operations of various portions, such as the injectors 23, the spark plugs 24, and the valve timing controllers 42, on the basis of the operating conditions and the operation state of the engine 1 and the number of operating cylinders. Moreover, the ECU 6 estimates the state of generation of vibration within the engine block 2 on the basis of angular acceleration of The unillustrated crankshaft, and controls the operations of the first mount 51 and the second mount 52 on the basis of the estimated state.

Incidentally, in a structure of the engine 1 as in the present embodiment, in general, vibration and noise which give an unpleasant feeling to a driver and passengers of a vehicle tend to increase when the engine 1 enters a selected cylinder operation and the number of operating cylinders decreases. In particular, in the four-cylinder operation mode, the interval of ignition and explosion between operating cylinders becomes irregular. During the four-cylinder operation mode in which explosion occurs at irregular intervals, vibration and noise may become greater.

In view of such a problem, in the engine 1 of the present embodiment, when the number of operating cylinders is small or when the engine enters the four-cylinder operation mode in which explosion occurs at irregular intervals, the ECU 6 lowers the peak of cylinder internal pressure by retarding the ignition timing, to thereby lower the vibration/noise level.

Specifically, in order to suppress combustion vibration and reduce fuel consumption simultaneously, preferably, the amount of the ignition timing retard is greater in one state whose number of operating cylinders is small than the other state whose number of operating cylinders is greater than the one state, under the condition that an amount of intake air per cylinder and an amount of fuel per cylinder are the same.

SPECIFIC EXAMPLES OF THE OPERATION IN THE CONFIGURATION OF THE PRESENT EMBODIMENT

Next, specific examples of the operation of the engine 1 of the present embodiment will be described with reference to flowcharts. Notably, in the following description of the flowcharts and in the drawings showing the flowcharts, "step" is abbreviated to "S."

Example 1

Figure 2:
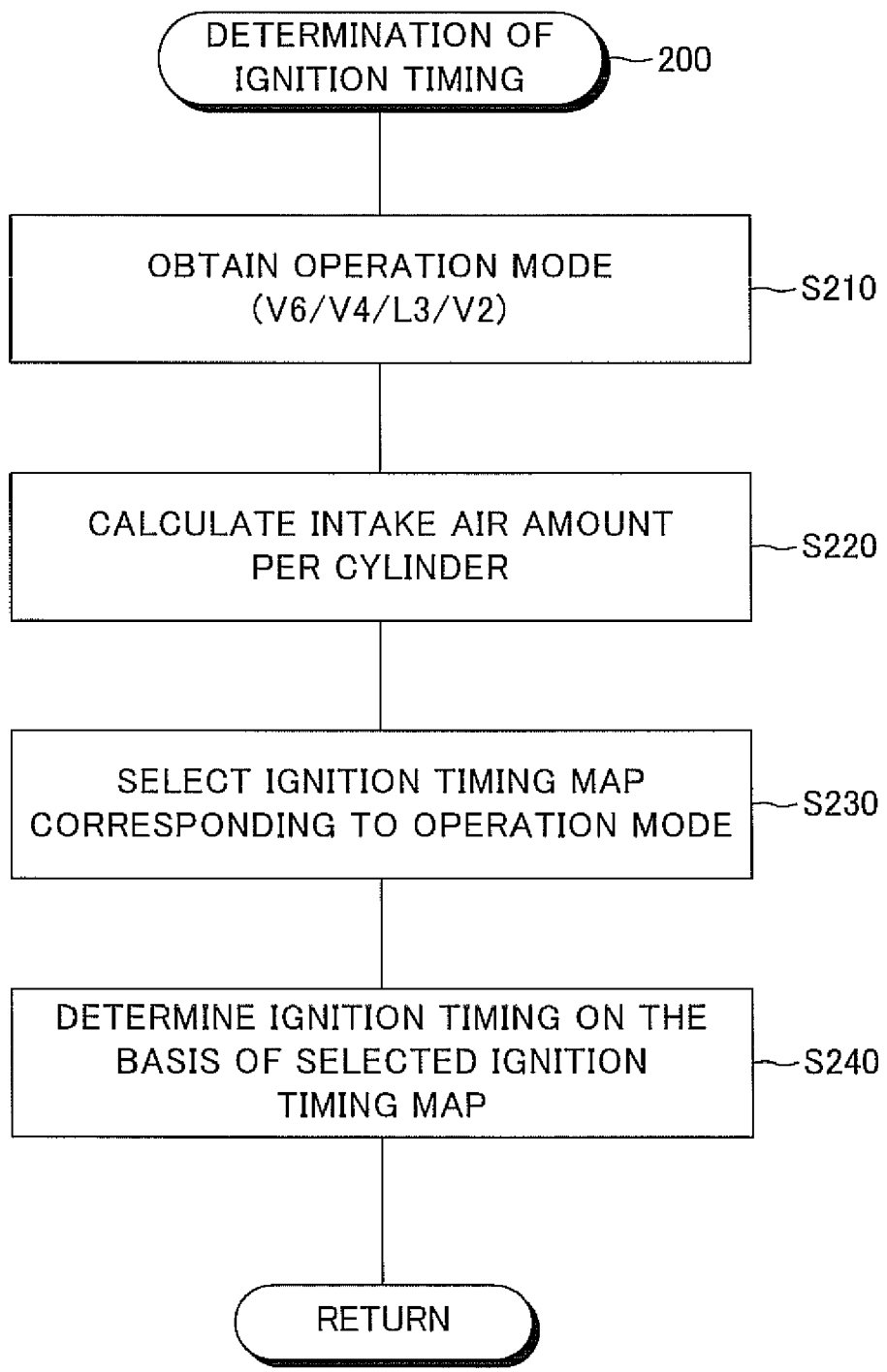
FIG. 2 is a flowchart showing a specific example of an ignition timing determination routine executed by an ECU shown in FIG. 1.

FIG. 2 is a flowchart showing a specific example of an ignition timing determination routine 200 executed by the ECU 6 shown in FIG. 1. The ECU 6 repeatedly executes this routine 200 every time the crank angle reaches a predetermined value (e.g., BTDC90° CA).

When this routine is executed, an operation mode at the present, which is determined on the basis of the operating conditions, etc. through execution of a predetermined operation mode determination routine, is acquired in S210. Next, in S220, an intake air amount per cylinder is calculated on the basis of an intake air flow rate Ga which is determined from an output of an air flow meter, the above-mentioned operation mode, etc.

Subsequently, in S230, an ignition timing map corresponding to the operation mode is selected. This ignition timing map is a two-dimensional map for determining ignition timing on the basis of engine speed and intake air amount per cylinder (load factor), and is prepared for each operation mode.

In the present specific example (first specific example), the ignition timing maps for the above-mentioned operation modes are formed such that, when the ignition timings determined by use of the ignition timing maps are compared under the same engine speed and load factor, the smaller the number of operating cylinders, the greater the amount by which the ignition timing is retarded (for example, when the speed is 2000 rpm and the load factor is 40%, the ignition timing [BTDC° CA] is set in such a manner that the ignition timing is 30° in the full-cylinder operation mode, 27° in the four-cylinder operation mode, 24° in the three-cylinder operation mode, and 20° in the two-cylinder operation mode). Notably, on the basis of results of experiments, computer simulation, or the like, the amount of the ignition timing retard is set to a range in which a fuel consumption reduction effect is attained through the selected cylinder operation (within a range in which the fuel consumption reduction effect is not eliminated completely). Notably, the amount of the ignition timing retard is set in the same manner in other specific examples.

After that, the ignition timing is determined in S240 on the basis of the ignition timing map selected in S230 and the intake air amount obtained in S220. Subsequently, the current execution of the present routine is ended.

As described above, in the present specific example, the smaller the number of operating cylinders, the greater the amount by which the ignition timing is retarded.

Example 2

In the present specific example (second specific example), the same flowchart as employed in the first specific example is used.

However, unlike the first specific example, in the present specific example, the ignition timing maps for the above-mentioned operation modes are formed such that, when the ignition timings determined by use of the ignition timing maps are compared under the same engine speed and load factor, the ignition timing is retarded only in the four-cylinder operation mode in which explosion occurs at irregular intervals (for example, when the speed is 2000 rpm and the load factor is 40%, the ignition timing [BTDC° CA] is set in such a manner that the ignition timing is 30° in the full-cylinder operation mode, 25° in the four-cylinder operation mode, 30° in the three-cylinder operation mode, and 30° in the two-cylinder operation mode).

Example 3

In the present specific example (third specific example), the same flowchart as employed in the first specific example is used.

However, unlike the first specific example, in the present specific example, the ignition timing maps for the above-mentioned operation modes are formed such that, when the ignition timings determined by use of the ignition timing maps are compared under the same engine speed and load factor, the ignition timing is retarded by the greatest amount in the four-cylinder operation mode in which explosion occurs at irregular intervals, and the amount of the ignition timing retard increases as the number of operating cylinders decreases in the remaining operation modes in which explosion occurs at constant intervals (for example, when the speed is 2000 rpm and the load factor is 40%, the ignition timing [BTDC° CA] is set in such a manner that the ignition timing is 30° in the full-cylinder operation mode, 23° in the four-cylinder operation mode, 27° in the three-cylinder operation mode, and 24° in the two-cylinder operation mode).

Example 4

In the present specific example (fourth specific example), the ECU 6 lowers the peak of cylinder internal pressure by retarding the ignition timing, and compensates a drop in engine output attributable to retarding of the ignition timing, through a correction operation of increasing the amount of fuel injection, to thereby enable the required output to be obtained.

Figure 3:
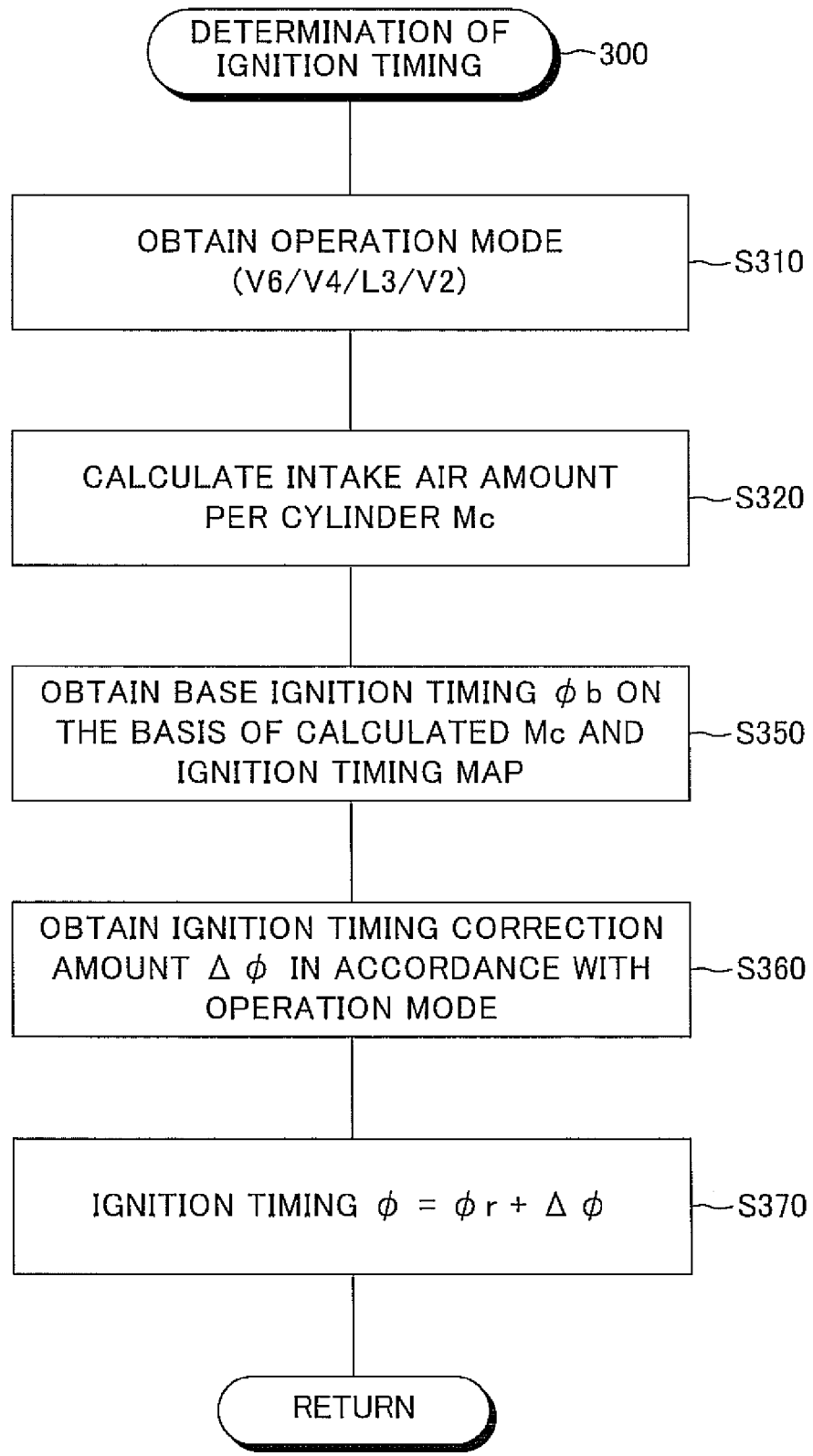
FIG. 3 is a flowchart showing another specific example of the ignition timing determination routine executed by the ECU shown in FIG. 1.

FIG. 3 is a flowchart showing an ignition timing determination routine 300 in the present specific example. When this routine is executed, as in the above-described S210 and S220 (see FIG. 2), the present operation mode is acquired in S310, and the intake air amount Mc per cylinder is calculated in S320.

Next, in S350, a base ignition timing φb is obtained on the basis of the ignition timing map and the intake air amount Mc per cylinder calculated in S320. Subsequently, in S360, an ignition timing correction amount Δφ is obtained in accordance with the operation mode by making use of a map or the like. The ignition timing correction amount Δφ can be set such that it corresponds to the amount of the ignition timing in the above-described specific examples. After that, in S370, the ignition timing φ is determined from the base ignition timing φb and the ignition timing correction amount Δφ. Subsequently, the current execution of the present routine is ended.

Figure 4:
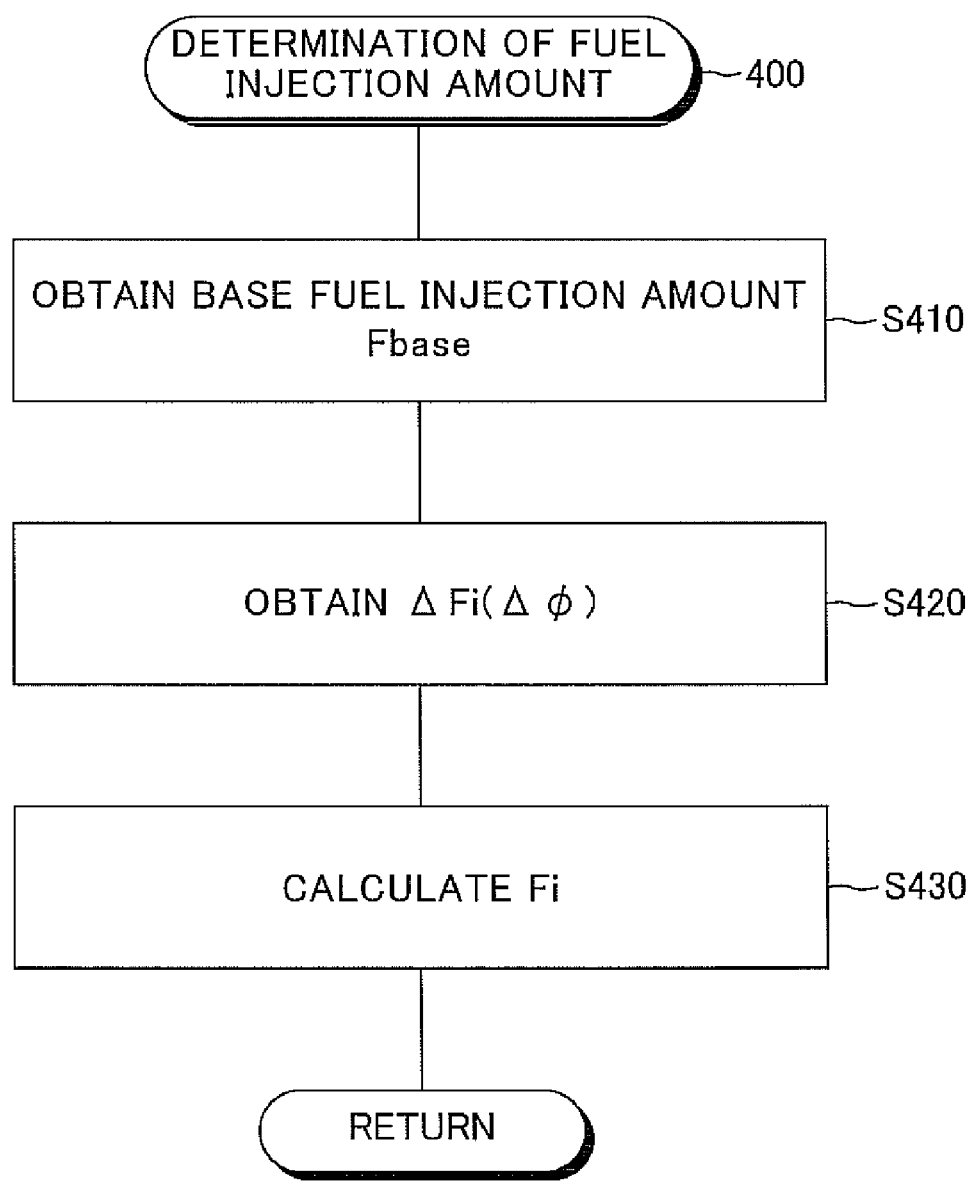
FIG. 4 is a flowchart showing a specific example of a fuel injection amount determination routine executed by the ECU shown in FIG. 1.

FIG. 4 is a flowchart showing a fuel injection amount determination routine 400 in the present specific example. When the present routine is executed, in S410, a base fuel injection amount Fbase is first obtained on the basis of engine speed, engine load, etc.

Next, in S420, a fuel-injection-amount increase correction value ΔFi corresponding to the ignition timing correction amount Δφ is obtained. On the basis of results of experiments, computer simulation, or the like, the fuel-injection-amount increase correction value ΔFi is set to a range in which a fuel consumption reduction effect is attained through the selected cylinder operation (within a range in which the fuel consumption reduction effect is not eliminated completely).

Subsequently, in S430, a command fuel injection amount Fi is calculated on the basis of the fuel-injection-amount increase correction value ΔFi and other fuel-injection-amount increase correction values (air-fuel-ratio feedback correction value, etc.). After that, the current execution of the present routine is ended. <Effects of the Present Embodiment>

In the engine 1 of the present embodiment, when the number of operating cylinders is small or when the engine enters the four-cylinder operation mode in which explosion occurs at irregular intervals, the peak of cylinder internal pressure is lowered by means of retarding the ignition timing. Thus, the vibration/noise level in operation modes in which vibration and noise tend to become greater can be effectively suppressed. Accordingly, suppression of vibration and noise by the first mount 51 and the second mount 52 can be performed effectively.

In the engine 1 of the present embodiment, in the above-mentioned case, the peak of cylinder internal pressure is lowered by means of retarding the ignition timing, and a drop in output stemming from the retarding of the ignition timing is compensated by means of a correction operation of increasing the fuel injection amount. Thus, a required output can be obtained, while vibration and noise are suppressed.

That is, in the present embodiment, the ignition timing is retarded from MBT (Minimum Spark Advance for Best Torque: the optimal ignition timing) in order to suppress engine combustion vibration generated as a result of a decrease in the number of operating cylinders. As a result, the peak of cylinder internal pressure is lowered. However, when the ignition timing is merely retarded from the MBT, the engine output becomes insufficient, which causes the driver to further depress the accelerator pedal. As a result, even though the number of operating cylinders has been decreased, the number of operating cylinders is subsequently increased, and the fuel consumption reduction effect cannot be attained satisfactorily.

In view of the above, in the present embodiment, the operation of decreasing the number of operating cylinders and the correction operation of increasing the fuel injection amount are carried out simultaneously. Since the correction operation of increasing the amount of fuel injected to each cylinder is carried out for compensating a drop in engine output attributable to retarding of the ignition timing, the above-mentioned intervention by the driver; i.e., driver's operation of depressing the accelerator pedal, can be restrained. Accordingly, a reduction in the number of operating cylinders, accompanied by retarding of the ignition timing, becomes possible, whereby the effect of suppressing combustion vibration through lowering the peak of combustion pressure and the fuel consumption reduction effect can be achieved at the same time.

In the engine 1 of the present embodiment, since operations of the intake valves 21 and the exhaust valves 22 corresponding to stop cylinders are stopped, pumping loss can be reduced satisfactorily. Thus, satisfactory fuel consumption characteristics can be attained.

In the engine 1 of the present embodiment, cylinders operated in the four-cylinder operation mode are stopped in the two-cylinder operation mode, and cylinders stopped in the four-cylinder operation mode are operated in the two-cylinder operation mode. That is, the stopped cylinders and the operating cylinders are switched between the two-cylinder operation mode and the four-cylinder operation mode. As a result, an imbalance in terms of use of cylinders for combustion can be suppressed to a possible extent. Thus, satisfactory heat management can be performed in contrast to the case where specific cylinders are operated continuously for a long period of time or stopped continuously for a long period of time.

In the engine 1 of the present embodiment, the A3 cylinder and the B1 cylinder, which are diagonally opposite each other, are stopped in the four-cylinder operation mode, and operated in the two-cylinder operation mode. Therefore, symmetry of ignited (operating) cylinders is secured, and constant-interval expansion in the two-cylinder operation mode is realized. Accordingly, generation of vibration and noise in these operation modes can be suppressed to a possible extent. Further, since symmetry of heat generation portions is secured to a possible extent, more satisfactory heat management can be performed.

<Modifications>

The above-described embodiment is, as mentioned previously, a mere example of the best mode which the applicant of the present invention contemplated at the time of filing the present application. Therefore, the present invention is not limited to the above-described embodiment. Various modifications to the above-described embodiment are possible so long as the invention is not modified in essence.

Typical modifications will next be exemplified. Needless to say, even modifications are not limited to those exemplified below. The entireties or portions of the embodiment and following modifications are applicable in appropriate combination so long as no technical inconsistencies are involved.

The above-described embodiment and the following modifications should not be construed as limiting the present invention (particularly, those components which partially constitute the means for solving the problems to be solved by the invention and are expressed operationally and functionally). Such limiting construal unfairly impairs the interests of an applicant who is motivated to file as quickly as possible under the first-to-file system; unfairly benefits imitators; and is thus impermissible.

(1) No limitation is imposed on the mechanical structure of a multi-cylinder engine to which the present invention is applied.

For example, the present invention is applicable to gasoline engines, diesel engines, methanol engines, bio-ethanol engines, and other types of engines. No limitation is imposed on the number of cylinders and the arrangement of cylinders (straight, V-type, horizontally opposed). That is, the present invention can be favorably applied to, for example, V5 engines, V6 engines, V8 engines, V12 engines, L4 engines, L5 engines, L6 engines, etc.

No limitation is imposed on the fuel injection scheme (direct injection, port injection, and dual injection employing both these injection methods). Further, the present invention can be suitably applied to an engine 1 in which fuel is supplied by a carburetor rather than by means of fuel injection from an injector.

The V-type, six-cylinder engine 1 of the above-described embodiment may be configured to operation only in three modes; i.e., the full-cylinder operation mode, the four-cylinder operation mode, and the three-cylinder operation mode in which one of the banks is stopped. In this case, the structures for driving the intake valves 21 and the exhaust valves 22 for two cylinders (e.g., the B1 cylinder and the B2 cylinder) which are operated all times may be modified in such a manner that they always rock upon rotation of cams provided on the intake cam shafts 41 and the exhaust cam shafts 46. That is, in this case, a simple structure in which the sub rocker arms and the connection changeover sections are omitted and the rocker arms are caused to rock by the cam shafts is applied to the two cylinders which are operated all times.

Alternatively, the V-type, six-cylinder engine 1 of the above-described embodiment may be modified to operate the A1 cylinder and the B2 cylinder in the two-cylinder operation mode. In the two-cylinder operation mode in this case, the number of operating cylinders is the smallest, and explosion occurs at inconstant intervals. Therefore, in each of the above-described specific examples, the ignition timing of this two-cylinder operation mode is set to the most retarded angle.

The valve timing controllers 42 may be provided for the exhaust cam shafts 46. That is, the valve timings of the exhaust valves 22 may be changed continuously.

In place of or in addition to the first mount 51 and the second mount 52, the third mount 53 and the fourth mount 54 may be active mounts. Alternatively, one of the first mount 51 and the second mount 52 and one of the third mount 53 and the fourth mount 54 may be active mounts.

(2) The present invention is not limited to the control modes of the above-described specific examples (Examples).

For example, the above-described specific examples can be favorably applied not only to the time of steady operation but also to the time of transient operation.

Further, the intake air amount Mc may be increased through adjustment of valve lift timing in place of or in addition to increasing the fuel injection amount which is performed together with the ignition timing retard.

The sequence of igniting cylinders may be freely changed from that employed in the above-described embodiment. Specifically, the ignition sequence may be set such that ignition is performed in the sequence of B1-A1-B2-A2-B3-A3. In this case, in the four-cylinder operation mode (the A1 cylinder and the B3 cylinder are stopped), processing for suppressing torques generated by the B1 cylinder and the A2 cylinder and increasing torques generated by the B2 cylinder and the A3 cylinder may be performed.

Further, the ignition timing retard control may be performed only in an operation range in which combustion vibration is severe and the number of operating cylinders is relatively small (for example, the two-cylinder operation mode in the V6 engine). Thus, suppression of combustion vibration and reduction of fuel consumption can be realized simultaneously.

In the ignition timing retard control of the first specific example, the ignition timing maps for the above-mentioned operation modes are formed such that, when the ignition timings determined by use of the ignition timing maps are compared under the same engine speed and load factor, the smaller the number of operating cylinders, the greater the amount by which the ignition timing is retarded. Needless to say, the "same load factor" is equivalent to conditions that "the intake air amount per cylinder is the same."

Needless to say, when the intake air amount per cylinder is the same, in general, the fuel amount (fuel injection amount) per cylinder is the same. Therefore, in the first specific example, it can be said that the ignition timing is set such that, when the number of operating cylinders is smaller than a state, the amount of the ignition timing retard is greater than the state, under the condition that the amount of intake air per cylinder and the amount of fuel per cylinder (the base fuel injection amount Fbase in the case of the fourth specific example) are the same.

(3) Modifications which are not specifically described herein naturally fall within the scope of the present invention, so long as they do not change the essential portion of the present invention.

Those components which partially constitute the means for solving the problems to be solved by the invention and are expressed operationally and functionally encompass not only the specific structures disclosed above in the description of the above embodiment and modifications but also any other structures that can implement the operations and functions of the components. Further, the contents (including specifications and drawings) of the publications cited in the present specification are incorporated herein by reference.

What is claimed is:

1. A multi-cylinder engine capable of performing a selected cylinder operation in which combustion is stopped in some cylinders, the multi-cylinder engine comprising:

an ignition-timing adjustment section configured such that, when the engine is in a second state in which the number of operating cylinders is smaller than that in a first state, the ignition-timing adjustment section retards ignition timing of each operating cylinder from that in the first state; and a fuel injection adjustment section which receives a fuel injection amount increase correction value for increasing an amount of fuel injected into each operating cylinder in order to compensate a drop in engine output due to the retarded ignition timing;

wherein the ignition-timing adjustment section controls the ignition timing such that, when the number of operating cylinders is smaller than a state, the amount of ignition timing retard is greater than the state, under the condition that an amount of intake air per cylinder and an amount of fuel per cylinder are the same.

2. The multi-cylinder engine according to claim 1, further comprising:
an active mount which elastically supports a body of the multi-cylinder engine and generates a vibration which cancels out a vibration generated during operation of the engine.

3. The multi-cylinder engine comprising a first-bank cylinder group including a first-bank first cylinder, a first-bank second cylinder, and a first-bank third cylinder which are arranged in a row along a cylinder arrangement direction to be in parallel with one another; and a second-bank cylinder group including a second-bank first cylinder, a second-bank second cylinder, and a second-bank third cylinder, which have center axes forming an angle greater than 0 degrees but not greater 180 degrees in relation to center axes of the first-bank first to third cylinders and are arranged in a row along the cylinder arrangement direction to be in parallel with one another,
the multi-cylinder engine being capable of switching its operation among a full-cylinder operation mode in which all the cylinders are operated; a two-cylinder operation mode in which one cylinder of the first-bank cylinder group and one cylinder of the second-bank cylinder group are operated; a three-cylinder operation mode in which three cylinders of the first-bank cylinder group or the second-bank cylinder group are operated; and a four-cylinder operation mode in which one cylinder of the first-bank cylinder group and one cylinder of the second-bank cylinder group are stopped,
wherein the multi-cylinder engine comprises an ignition-timing adjustment section which retards ignition timing of each operating cylinder in such a manner that the smaller the number of operating cylinders, the greater the amount by which the ignition timing of each operating cylinder is retarded; and
a fuel injection adjustment section which receives a fuel injection amount increase correction value for increasing an amount of fuel injected into each operating cylinder in order to compensate a drop in engine output due to the retarded ignition timing;
wherein the ignition-timing adjustment section controls the ignition timing such that, when the number of operating cylinders is smaller than a state, the amount of ignition timing retard is greater than the state, under the condition that an amount of intake air per cylinder and an amount of fuel per cylinder are the same.

4. The multi-cylinder engine according to claim 3, wherein, in the two-cylinder operation mode, the first-bank first cylinder and the second-bank third cylinder, which are located diagonally opposite each other, are operated, and, in the four-cylinder operation mode, the cylinders which are operated in the two-cylinder operation mode are stopped.

5. The multi-cylinder engine according to claim 4, further comprising:
an active mount which elastically supports a body of the multi-cylinder engine and generates a vibration which cancels out a vibration generated during operation of the engine.

6. The multi-cylinder engine according to claim 3, wherein, in the two-cylinder operation mode, the first-bank first cylinder and the second-bank third cylinder, which are located diagonally opposite each other, are operated, and, in the four-cylinder operation mode, the cylinders which are operated in the two-cylinder operation mode are stopped.

7. The multi-cylinder engine according to claim 3, wherein the fuel injection adjustment section increases the amount of fuel injected into each operating cylinder when the ignition-timing adjustment section retards the ignition timing of each operating cylinder.

8. A multi-cylinder engine comprising a first-bank cylinder group including a first-bank first cylinder, a first-bank second cylinder, and a first-bank third cylinder which are arranged in a row along a cylinder arrangement direction to be in parallel with one another; and a second-bank cylinder group including a second-bank first cylinder, a second-bank second cylinder, and a second-bank third cylinder, which have center axes forming an angle greater than 0 degrees but not greater 180 degrees in relation to center axes of the first-bank first to third cylinders and are arranged in a row along the cylinder arrangement direction to be in parallel with one another,
the multi-cylinder engine being capable of switching its operation among a full-cylinder operation mode in which all the cylinders are operated; a two-cylinder operation mode in which one cylinder of the first-bank cylinder group and one cylinder of the second-bank cylinder group are operated; a three-cylinder operation mode in which three cylinders of the first-bank cylinder group or the second-bank cylinder group are operated; and a four-cylinder operation mode in which one cylinder of the first-bank cylinder group and one cylinder of the second-bank cylinder group are stopped,
wherein the multi-cylinder engine comprises an ignition-timing adjustment section which retards ignition timing of each operating cylinder in the four-cylinder operation mode from that in the full-cylinder operation mode;
a fuel injection adjustment section which receives a fuel injection amount increase correction value for increasing an amount of fuel injected into each operating cylinder in order to compensate a drop in engine output due to the retarded ignition timing; and
an active mount which elastically supports a body of the multi-cylinder engine and generates a vibration which cancels out a vibration generated during operation of the engine.

9. The multi-cylinder engine according to claim 8, wherein the ignition-timing adjustment section retards ignition timing of each operating cylinder in the four-cylinder operation mode from that in the three-cylinder operation mode.

10. The multi-cylinder engine according to claim 9, wherein, in the two-cylinder operation mode, the first-bank first cylinder and the second-bank third cylinder, which are located diagonally opposite each other, are operated, and, in the four-cylinder operation mode, the cylinders which are operated in the two-cylinder operation mode are stopped.

11. The multi-cylinder engine according to claim 8, wherein, in the two-cylinder operation mode, the first-bank first cylinder and the second-bank third cylinder, which are located diagonally opposite each other, are operated, and, in the four-cylinder operation mode, the cylinders which are operated in the two-cylinder operation mode are stopped.

12. The multi-cylinder engine according to claim 8, wherein the fuel injection adjustment which increases the amount of fuel injected into each operating cylinder when the ignition-timing adjustment section retards the ignition timing of each operating cylinder.

13. A multi-cylinder engine capable of performing a selected cylinder operation in which combustion is stopped in some cylinders, the multi-cylinder engine comprising:

an ignition-timing adjustment section which retards ignition timing of each operating cylinder when ignition intervals of a plurality of operating cylinders become irregular during the selected cylinder operation; and a fuel injection adjustment section which receives a fuel injection amount increase correction value for increasing an amount of fuel injected into each operating cylinder in order to compensate a drop in engine output due to the retarded ignition timing;

wherein the ignition-timing adjustment section controls the ignition timing such that, when the number of operating cylinders is smaller than a state, the amount of ignition timing retard is greater than the state, under the condition that an amount of intake air per cylinder and an amount of fuel per cylinder are the same.

14. The multi-cylinder engine according to claim 13, further comprising:

an active mount which elastically supports a body of the multi-cylinder engine and generates a vibration which cancels out a vibration generated during operation of the engine.

15. The multi-cylinder engine according to claim 13, wherein the fuel injection adjustment section increases the amount of fuel injected into each operating cylinder when the ignition-timing adjustment section retards the ignition timing of each operating cylinder.

* * * * *